United States Patent [19]

Sakazawa et al.

[11] Patent Number: 5,550,590
[45] Date of Patent: Aug. 27, 1996

[54] BIT RATE CONTROLLER FOR MULTIPLEXER OF ENCODED VIDEO

[75] Inventors: Shigeyuki Sakazawa; Masahiro Wada, both of Tokyo, Japan

[73] Assignee: Kokusai Denshin Denwa Kabushiki Kaisha, Japan

[21] Appl. No.: 395,709

[22] Filed: Feb. 28, 1995

[30] Foreign Application Priority Data

| Mar. 4, 1994 | [JP] | Japan | ................................ 6-059921 |
| Jul. 8, 1994 | [JP] | Japan | ................................ 6-179795 |

[51] Int. Cl.$^6$ .............................. H04N 7/12; H04N 7/58
[52] U.S. Cl. ........................................ 348/387; 348/385
[58] Field of Search ................................ 348/385–388, 348/411–414; H04N 7/12, 7/58

[56] References Cited

U.S. PATENT DOCUMENTS

| 4,975,771 | 12/1990 | Kassatly | ............................... 348/385 |
| 5,115,309 | 5/1992 | Hang | ..................................... 348/388 |
| 5,231,384 | 7/1993 | Kuriacose | ............................ 348/388 |
| 5,231,494 | 7/1993 | Wachob | .............................. 348/385 |

OTHER PUBLICATIONS

"Statistical Performance Analysis of an Interframe Encoder for Broadcast Television Signals", IEEE Trans. COM-29, pp. 1868–1876 (1981).

*Primary Examiner*—Victor R. Kostak
*Attorney, Agent, or Firm*—Westman, Champlin & Kelly, P.A.

[57] ABSTRACT

In the present invention, by performing a control so that the I-coding modes of the encoders of a plurality of respective channels do not overlap each other, the amount of generated encoded information for the total system can be reduced without reducing the allowed amount of information of each encoder. Further, the bit rate $R_i$ ($i=1, 2, 3, \ldots$) which minimizes the mean square error (E) is determined, on condition that the total bit rate (R) is constant, and informed the encoder. The encoder encodes a video signal at the specified bit rate. This allows the total performance of the plurality of encoders to be increased under a predetermined total bit rate.

6 Claims, 9 Drawing Sheets

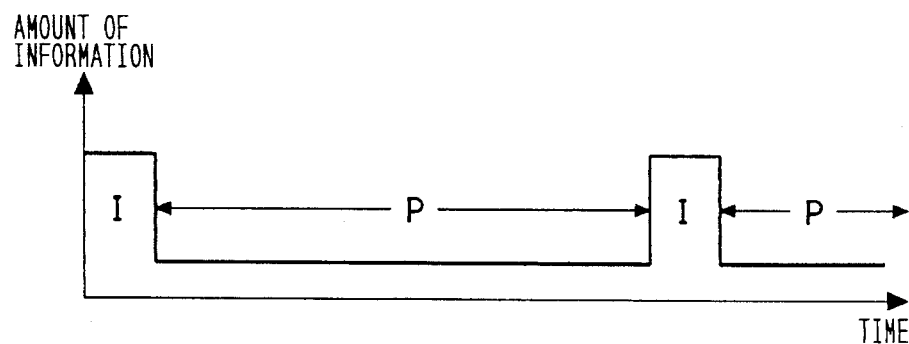
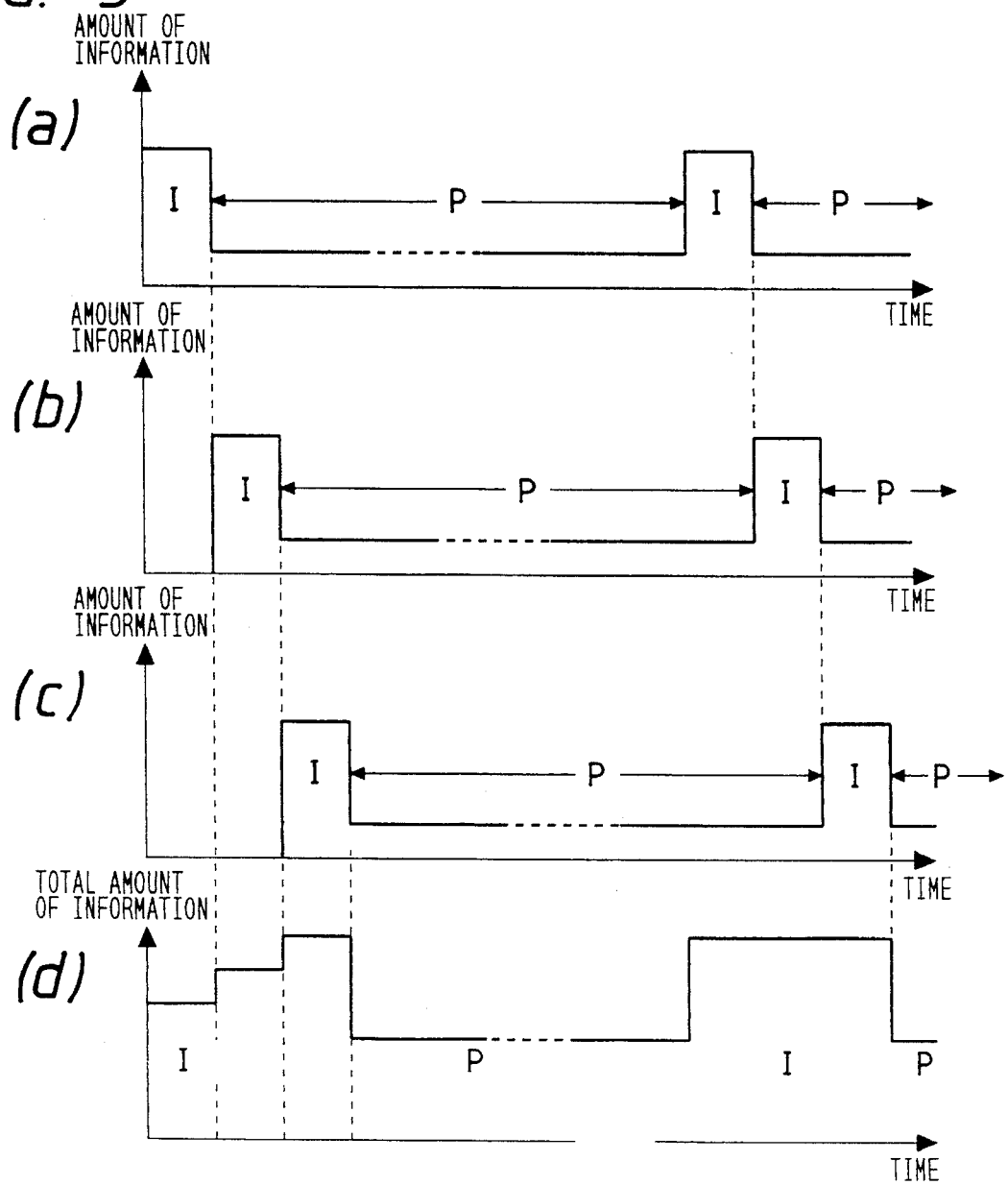

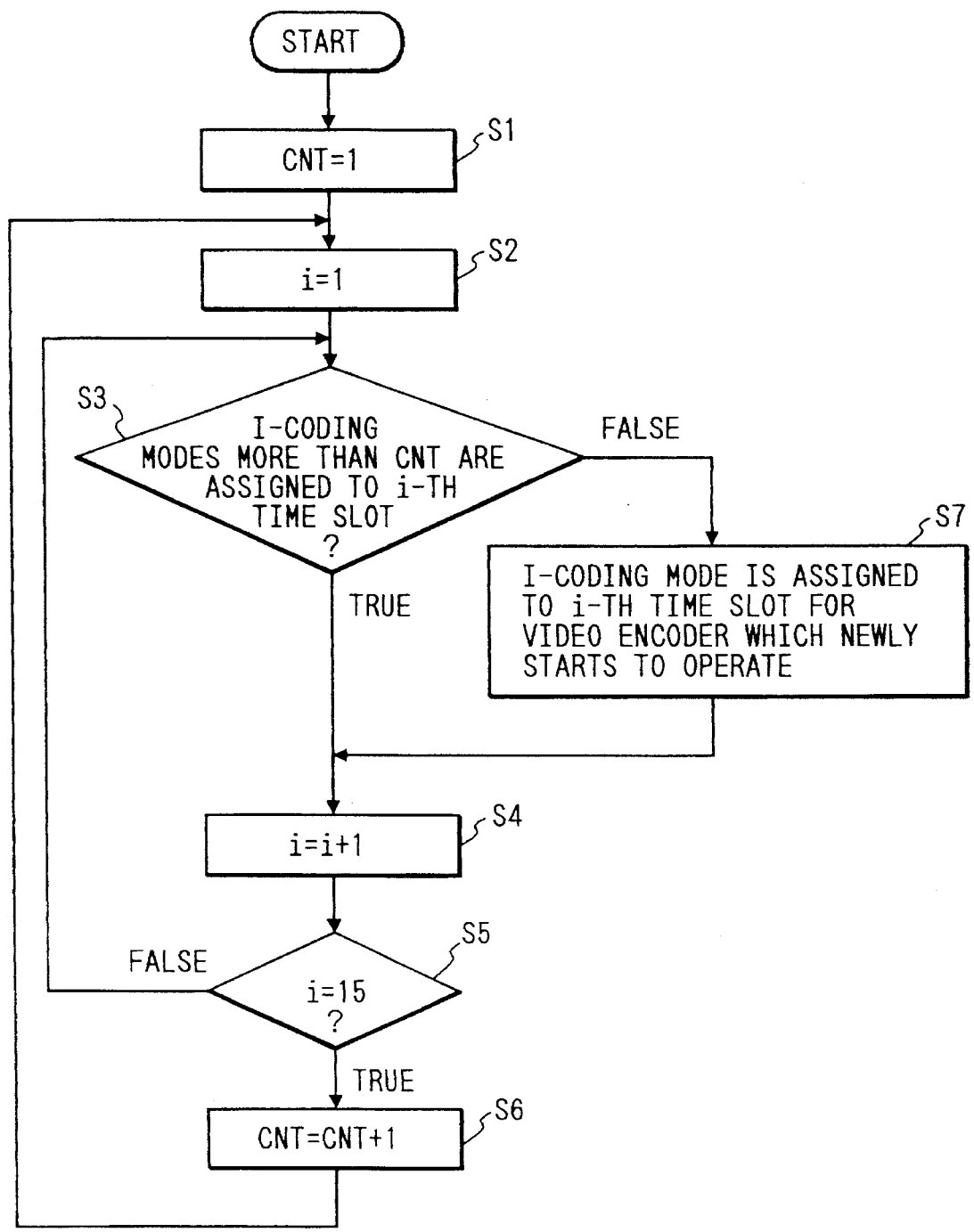

I: INTRA-FRAME CODING MODE
P: INTER-FRAME PREDICTIVE CODING MODE (1 FRAME)

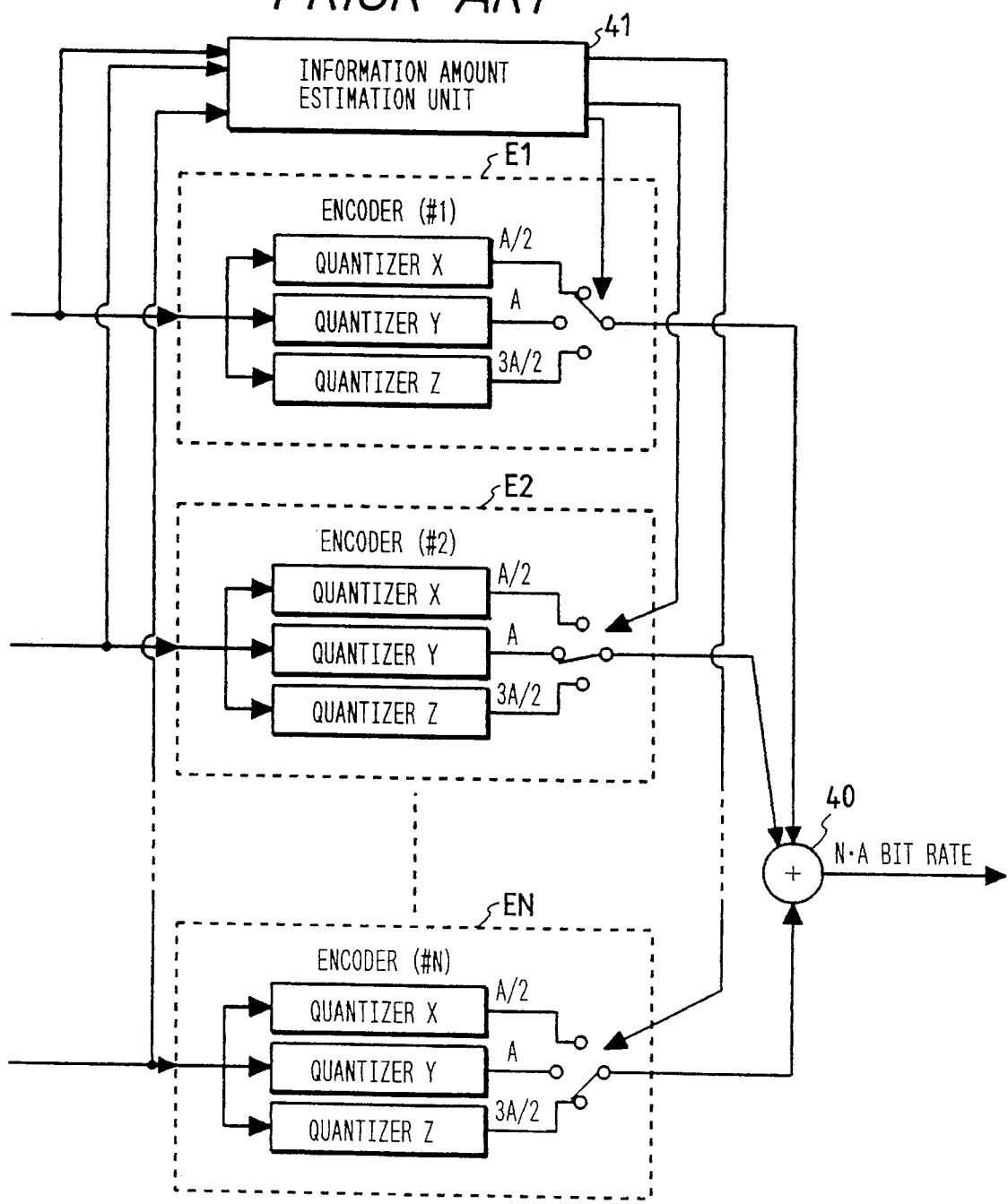

BIT RATE CONTROLLER FOR MULTIPLEXER OF ENCODED VIDEO

BACKGROUND OF THE INVENTION

1. Field of the Invention

The present invention is related to a multiplexer of an encoded video, and particularly to a multiplexer of an encoded video which enables the video of moving pictures of a plurality of channels to be encoded and transmitted at once in cable television broadcasting stations, video libraries or the like.

2. Description of the Prior Art

In the conventional video encoder system, there is a technique in which no bit rate control of the total system is performed, and a technique in which the bit rate control is performed by switching a plurality of previously prepared quantizers.

In the former technique, as shown in FIG. 14, each of N encoders E1 to EN is fixed to a bit rate A, and the encoding is performed at the bit rate A whether the amount of information contained in the picture input to the encoders E1 to EN is large or small.

In the latter technique, as shown in FIG. 15, a plurality of quantizers of different bit rates are provided in each encoder E1 to EN, and by determining the amount of information contained in the picture input to each encoder with an information amount estimation unit 41, the quantizer of each encoder is selected. For instance, if the amount of information contained in the picture input to the encoder E1 is small, the quantizer X having a bit rate A/2 is selected. If the picture information input to the encoder E2 has a moderate amount of information, the quantizer Y having a bit rate A is selected. Further, if the amount of information contained in the picture input to the encoder EN is large, the quantizer Z having a bit rate 3 A/2 is selected. In addition, the total bit rate to be output from an adder 40 is made to be N.A.

However, the above prior art has the following problems. In accordance with the technique shown in FIG. 14, the encoders E1 to EN perform the encoding at the same bit rate whether the amount of information contained in the picture input to them is large or small. For this, extreme deterioration occurs in pictures containing a large amount of information, or conversely, insufficient amount of information corresponding to a predetermined bit sate is generated in pictures Containing a small amount of information and dummy bits need to be added. As a result, it cannot be said that transmitted information is completely effectively utilized, and there is a problem that the subjective evaluation of the total system drops because of extremely deteriorating pictures.

In addition, in accordance with the technique shown in FIG. 15, in the encoders E1 to EN, only a finite number of types of quantizers X to Z can be prepared. For this, the bit rate of the encoders cannot be set to a value corresponding to the amount of information of the input picture, and thus there is a problem that effective utilization of the transmitted information is not sufficient though improved as compared with the technique of FIG. 14. It is necessary to increase the number of the quantizers to be provided, but there are many problems in putting this to practical use.

SUMMARY OF THE INVENTION

In view of the above problems of the prior art, it is an object of the present invention to provide a multiplexer of an encoded video which can perform the processing simply and in a short time regardless of the number of concurrently operating encoders, and can reduce the amount of encoded information for the total system without deteriorating the picture quality of any encoder.

It is a further object of the present invention to provide a controller for a video encoding system which can increase the total performance of a plurality of encoders under a predetermined total bit rate.

To accomplish the above objects, the present invention is characterized in that, in a multiplexer of an encoded video for multiplexing the encoded outputs of a plurality of video encoders, a controller is provided for controlling the operation timing of the plurality of video encoders so that the amounts of encoded output of the plurality of video encoders do not become maximized at the same time.

In accordance with the present invention, the controller controls the operation timing of a plurality of video encoders so that the amounts of encoded output information of the plurality of video encoders do not become maximized at the same time, and thus the processing can be performed simply and in a short time, and the amount of encoded information of the total system can be reduced as compared with the conventional system without degrading the picture quality of any encoder.

In addition, the present invention is a controller for a video encoder system in which a plurality of encoders are operated in parallel to obtain a plurality of encoded picture information at the same time, characterized by comprising a parameter determination unit for approximating the bit rate vs. coding distortion characteristics of each encoder by a linear equation of a bi-logarithmic graph to determine the parameters of it, and a bit rate determination unit for determining the bit rate for each encoder for minimizing the total sum of the coding distortions based on the equation provided by the parameter determination unit and on the condition that the total sum of the bit rate is constant.

In accordance with the present invention, the bit rate and coding distortion of each encoder are measured, and by the parameter determination unit, the linear equation of a bi-logarithmic graph representing the bit rate vs. coding distortion characteristics of each encoder is determined. The bit rate determination unit determines the bit rate to be assigned to each encoder for minimizing the perceptually weighted distortion of the total system under a given total bit rate. As a result, the perceptually weighted distortion of the total system can be minimized under a predetermined total bit rate.

BRIEF DESCRIPTION OF THE DRAWING

FIG. 3 is a figure for showing the difference in amount of information between the I-coding mode and the P-coding mode.

FIG. 4 is a flowchart for explaining the operation of the first embodiment.

FIG. 5 is a figure for explaining the operation of the present invention.

FIG. 15 is a block diagram showing another example of the conventional system.

DETAILED DESCRIPTION OF THE PREFERRED EMBODIMENT

The object of the multiplexer of an encoded video is that, when operating a plurality of encoders, the video quality of the total system is improved using a small amount of information by operating the respective encoders under an integrated control rather than by operating them completely independently.

An embodiment of the present invention is now described with reference to FIG. 1. In the figure, a first, second, . . . , and n-th video encoders $1a$, $1b$, . . . , and $1n$ encode video signals X1, X2, . . . , and Xn, respectively, and output encoded signals $2a$, $2b$, . . . . and $2n$ and frame encoding mode signals $3a$, $3b$, . . . , and $3n$. A multiplexer 5 multiplexes the encoded signals $2a$, $2b$, . . . , and $2n$ and outputs. A controller 6 creates and outputs operation timing signals $4a$, $4b$, . . . , and $4n$ based on the frame coding modes $3a$, $3b$, . . . , and $3n$.

Figure 2:
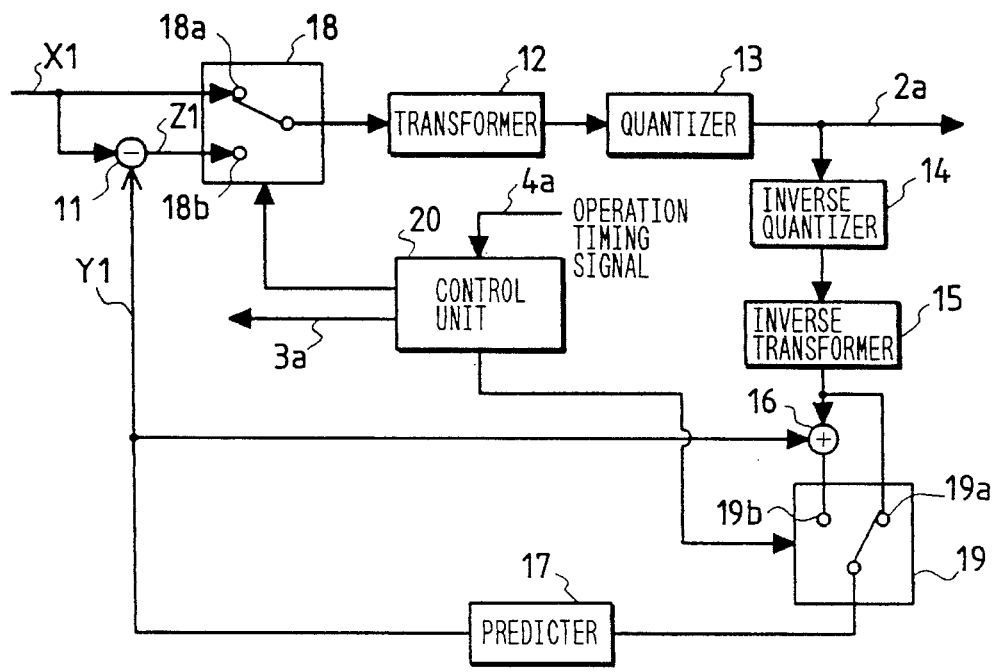
FIG. 2 is a block diagram showing a concrete example of the video encoder.

FIG. 2 shows a concrete example of the first video encoder $1a$. Since the second, . . . , and n-th video encoders $1b$, . . . , and $1n$ have the same or identical construction as the first video encoder $1a$, the concrete construction of the first video encoder $1a$ as a representative of them is described.

In FIG. 2, a subtracter 11 determines the difference between a video signal X1, for instance, of 8×8 pels, and a predicted video signal Y1 to generate a prediction error signal Z1. A transformer 12 performs a transform process such as a discrete cosine transform (DCT), and a quantizer 13 performs a quantization process. An inverse quantizer 14 inversely quantizes the quantized signal. An inverse transformer 15 performs an inverse discrete cosine transform (IDCT) or the like. An adder 16 adds the signal from the inverse transformer 15 and the predicted video signal A predictor 17 generates the predicted video signal Y1. Further, an I-coding mode/P-coding mode switch 18 is connected to a contact $18a$ in the I-coding mode, and to a contact $18b$ in the P-coding mode by the control signal from control unit 20. A switching unit 19 is also controlled by same signal.

Here, I-coding mode or an intra-frame coding mode means a mode for coding only in a frame, and P-coding mode or an inter-frame predictive coding mode means a mode for predictive coding between frames. FIG. 3 shows that the amount of Generated encoded information is large in the I-coding mode and small in the P-coding mode.

Upon receipt of instructions on the I-coding mode by a operation timing signal $4a$, the control unit 20 connects the I-coding mode/P-coding mode switch 18 to $18a$ and connects the switching unit 19 to $19a$, and controls the operation timings of the I-coding mode and the P-coding mode. For instance, a control is performed for repeating the operation in which an encoding by the I-coding mode is performed in one time slot, then an encoding by the P-coding mode is performed in the successive 14 time slots, and an encoding by the I-coding mode is performed in the next time slot.

The control unit 20 controls the I-coding mode/P-coding mode switch 18 to $18b$ during the operation timing for the P-coding mode, and also the switching unit 19 to $19b$. In addition, the control unit 20 outputs a frame coding mode signal $3a$ indicating in which of the I- and P-coding modes the video encoder is currently operating.

Figure 1:
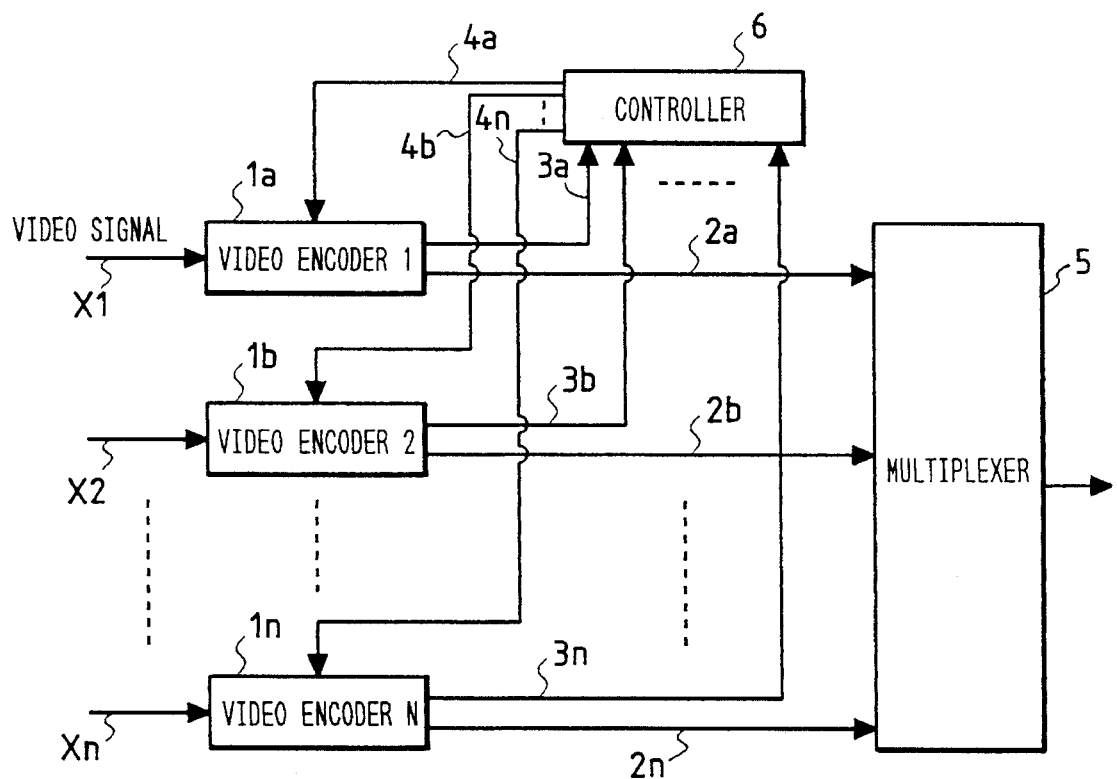
FIG. 1 is a block diagram showing the construction of an embodiment of the present invention.

The controller 6 in FIG. 1 produces and outputs operation timing signals $4a$, $4b$. . . , and $4n$ for instructing the video encoders $1a$, $1b$, . . . , and $1n$ on the I-coding mode, based on the frame coding mode signals $3a$, $3b$, . . . , and $3n$.

The operation of the controller 6 when the number of the time slots is 15 is described with reference to the flowchart of FIG. 4. In step S1, the value of a certain counter (CNT) is set to one. In step S2, the number i of the time slots is set to one. In step S3, it is determined whether or not the number of the I-coding modes assigned to the i-th time slot is larger than CNT, and if so, the process goes to step S4 to add one to i, otherwise the process goes to step S7 where the I-coding mode is assigned to the i-th time slot for the video encoder which newly starts to operate. In step S5, it is determined whether or not the i is equal to 15, and if the determination is negative, the process returns to step S3 to repeat a similar operation. On the other hand, if the step S5 is positive, the process goes to step S6 to add one to CNT. Thereafter, the process returns to step S2 to set i to one and repeat the above described operation. This operation ends when the operation of the whole system is halted.

Accordingly, in accordance with this embodiment, in the first, second, third, . . . , and n-th encoders, $1a$, $1b$, $1c$, . . . , and on, the I-coding modes having a large amount of encoded information do not overlap each other in the same time slot as shown, for instance, in (a), (b), and (c) of FIG. 5, and thus the total amount of information input to the multiplexer 5 is always small as shown in (d) of the same figure. Therefore, the amount of generated encoded information for the whole system can be reduced without reducing the allowed amount of information for each encoder.

Figure 6:
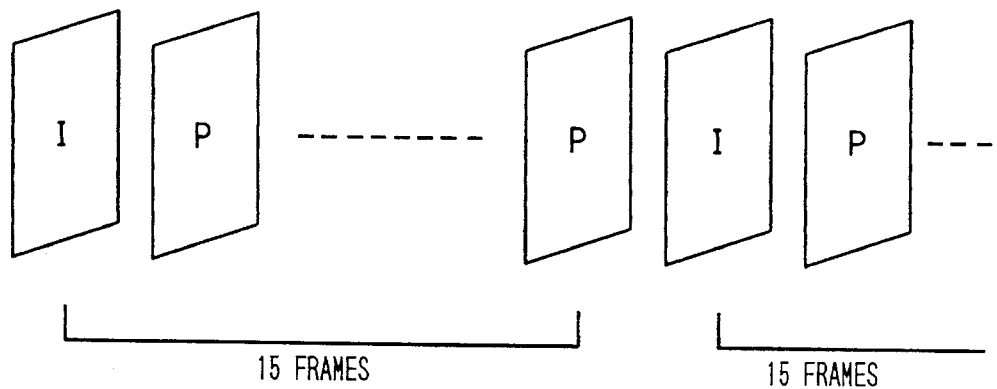
FIG. 6 is a figure showing the structure of the sequence of the coding modes of a system for encoding moving pictures.

In accordance with this embodiment, an information generation structure in which one frame of I-coding mode is inserted at every 14 frames of the P-coding mode is obtained, as shown in FIG. 6, and thus a transmission error of encoded signals can be handled a decoding process after interrupting is enabled. Incidentally, in this embodiment, it is natural that the I-coding modes overlap in some time slots if 16 or more video encoders concurrently operate.

Figure 7:
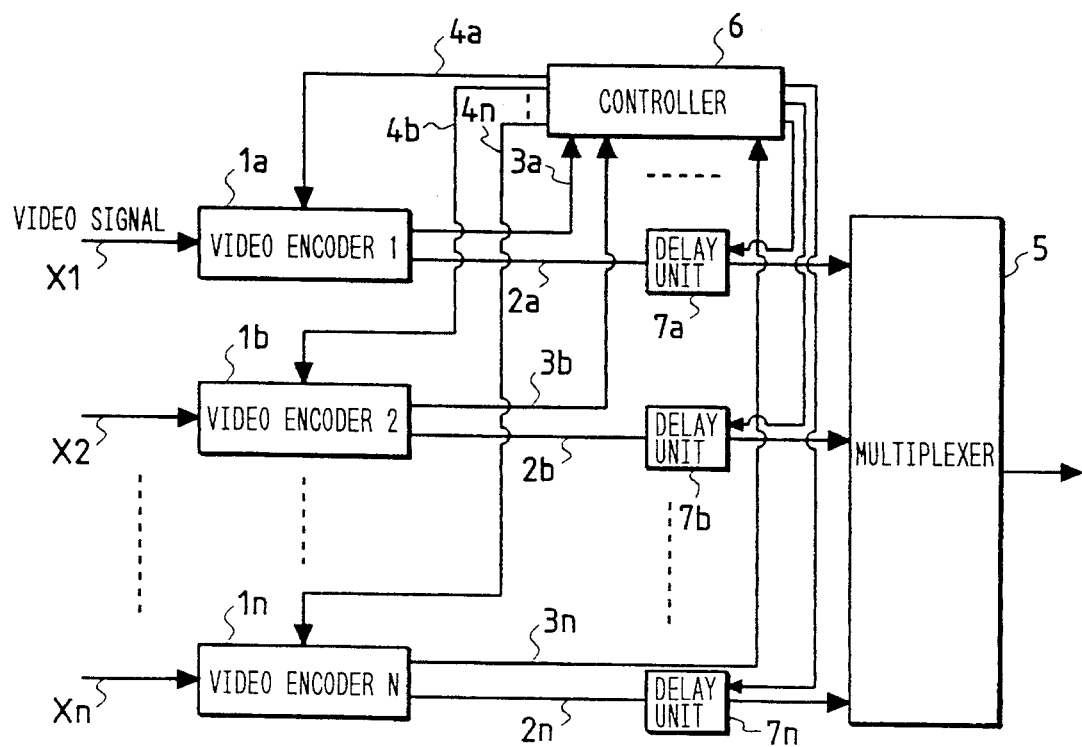
FIG. 7 is a block diagram showing the construction of the second embodiment of the present invention.

The second embodiment of the present invention is described below with reference to FIG. 7. In the system of the above first embodiment, the plurality of video encoders in which the I-coding mode is assigned to different time slots from the controller 6 are independently controlled by the respective control unit 20 and are concurrently operating. For this, the I-coding mode of one video encoder and part of the I-coding mode of other video encoder in the subsequent time slot may overlap each other. If such partial overlapping occurs, the amount of encoded information largely increases only in the overlapping portion. It is the second embodiment that dissolves the possibility of the occurrence of partial overlapping of I-coding modes.

In this embodiment, variable delay units 7a, 7b, . . . , and 7n are inserted in the output of the respective video encoders 1a, 1b, . . . , and 1n, and the delay amounts of the variable delay units 7a, 7b, . . . , and 7n are set according to the instructions from the controller 6.

Figure 8:
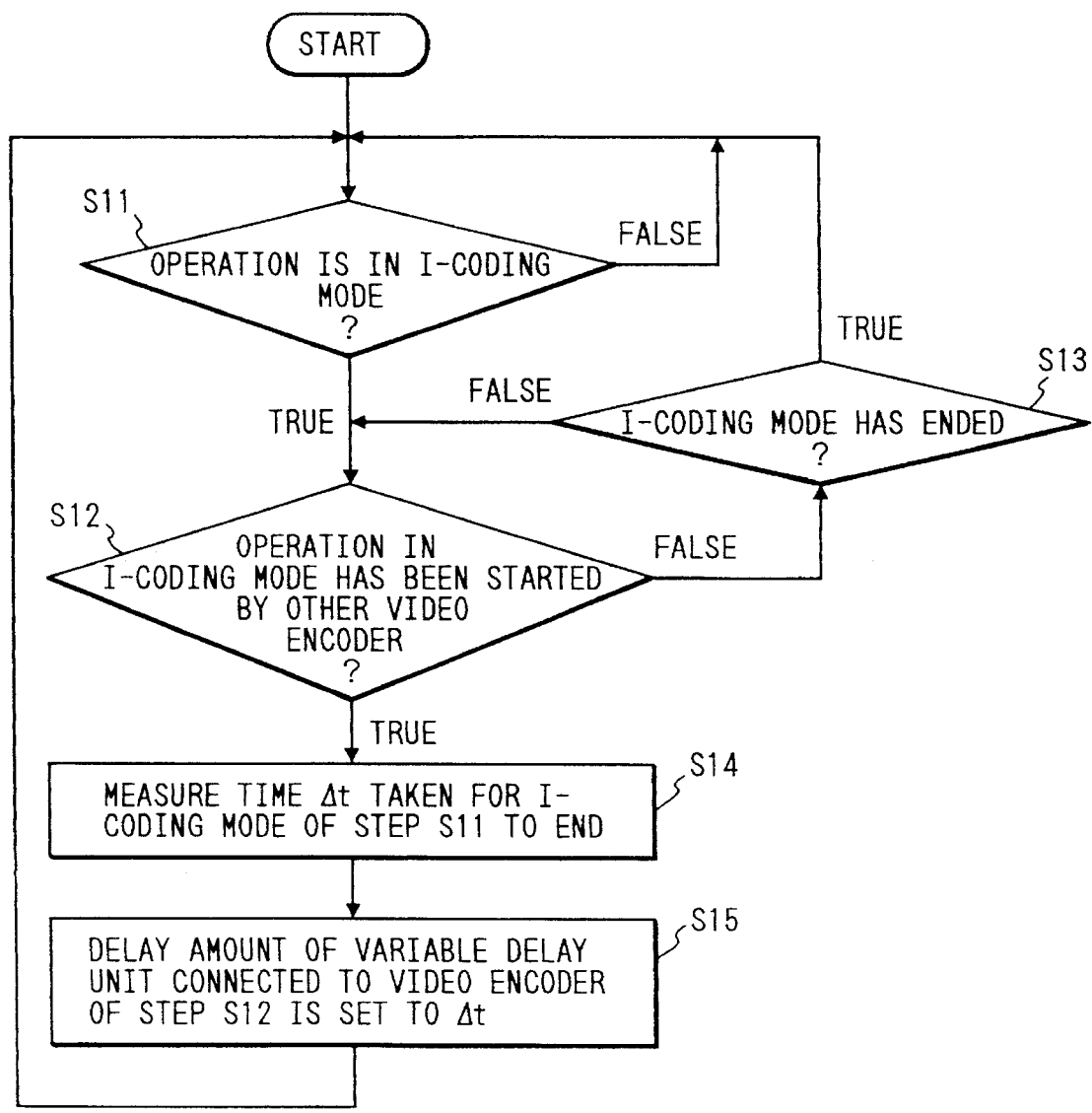
FIG. 8 is a flowchart fop explaining the operation of the second embodiment.

The operation of the controller 6 of this embodiment is described with reference to the flowchart of FIG. 8. In step S11, the controller 6 monitors the frame coding mode signals 3a, 3b, . . . , and 3n to determine whether or not any of the video encoders 1a to 1n is carrying out the operation in the I-coding mode. If this determination is positive, the process goes to step S12 to determine whether or not the operation in the I-coding mode by other video encoder has been started. If this determination is negative, the process goes to step S13 to determine whether or not the I-coding mode of step S11 has ended. If this determination is positive, there is no overlapping of I-coding modes, and thus the process returns to step S11 to determine again whether or not any of the video encoders 1a to 1n has begun the operation in the I-coding mode.

If step S12 becomes positive while the determination in the step S13 is negative, this means that an overlapping of I-coding modes has occurred, and the process goes to step S14 to measure the time Δt taken for the I-coding mode of step S11 to end. Then, the process goes to step S15 where the delay amount of the variable delay unit connected the video encoder of step S12 is set to the time Δt.

Accordingly, even if an overlapping occurs in the I-coding modes performed by two video encoders, the overlapping is dissolved by the delay by the variable delay unit, and thus the amount of encoded information in the multiplexer does not increase, but becomes stable. In addition, if the setting of the time Δt in the variable delay unit by the controller 6 can cause a delay in the operation, it is only needed to insert delay means of an equal delay amount between the video encoders 1a, 1b, . . . , and 1n and the variable delay units 7a, 7b, . . . , and 7n thereby to delay the arrival of the encoded signals output from the video encoders at the variable delay units 7a to 7n.

Figure 9:
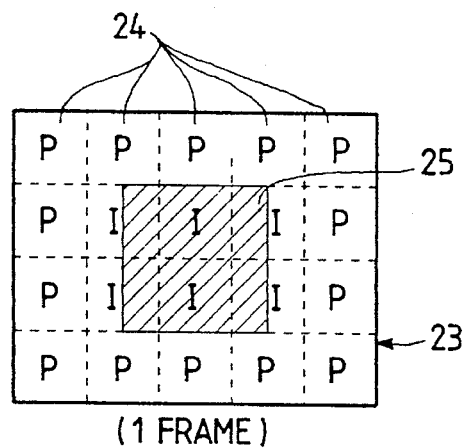
FIG. 9 is a figure showing a small picture region of one frame in which there is a large amount of encoded information, and a small picture region in which there is a small amount of encoded information.

The third embodiment of the present invention is described below with reference to FIGS. 9 and 10. Numeral 23 in FIG. 9 represents one frame of a video signal, and numeral 24 represents a block which is the minimum unit encoded by the video encoder (for instance, 8×8 pels). Further, numeral 25 represents a picture portion which is active, and the picture portion other than the picture portion 25 in the frame 23 represents the picture portion which is not active.

If, in such picture, an encoding in the I-coding mode is performed for the active picture portion 25 and an encoding in the P-coding is performed for the inactive portion, the total amount of encoded information of that one frame can be reduced. In some type of video, the active picture portion and the inactive picture portion as shown in FIG. 9 are fixed for a long time (for instance, the picture of a video conference). For such video, the P-coding mode and the I-coding mode of the above block regularly alternately appear for each frame. For instance, for the video of FIG. 9, the pattern of P-coding modes and I-coding modes in a period T in FIG. 10 repeatedly appears.

Figure 10:
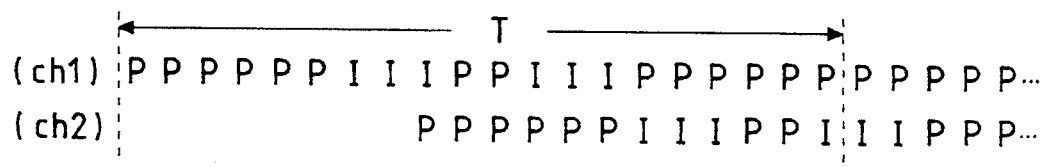
FIG. 10 is a figure for explaining the operation of the third embodiment of the present invention.

In this case, as shown in FIG. 10, by controlling the operation of the plurality of video encoders so that the I-coding modes of a channel 1 (ch1) and a channel 2 (ch2) do not overlap each other, the amount of encoded information as seen from each block can be reduced. In addition, as to whether the coding mode of each block is the I-coding mode or the P-coding mode, encoding mode selection information indicating in which encoding mode each block was encoded is included in the well-known macro block information in the transmission information output from each video encoder. Thus, the controller 6 (refer to FIG. 1) can control the operation of the plurality of encoders so that the I-coding modes do not overlap for each block, by extracting the encoding mode selection information in the macro block information to detect the encoding mode for each block.

Figure 11:
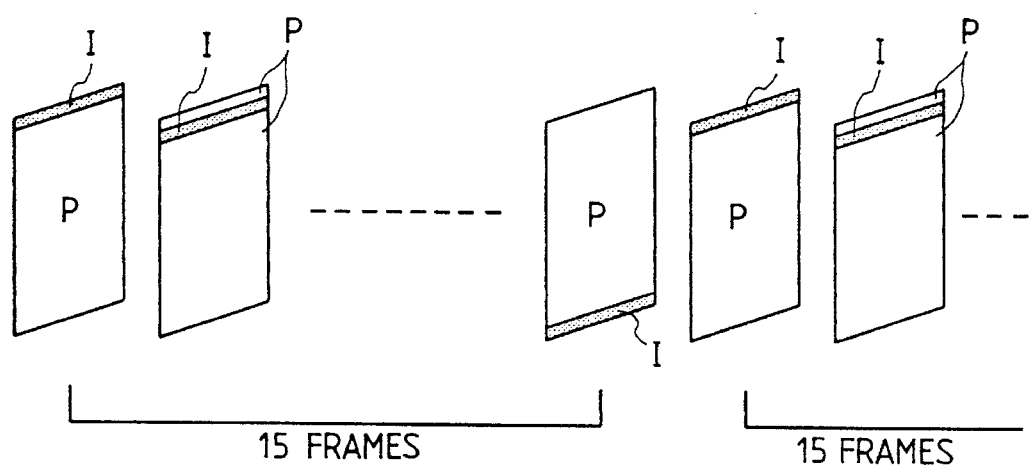
FIG. 11 is a figure for explaining the operation of the fourth embodiment of the present invention.

The fourth embodiment of the present invention is described below. As shown in FIG. 11, in this embodiment, one frame is divided into, for instance, 15 slices, and only the first slice is set to the I-coding mode and the remaining ones are set to the P-coding mode in the first frame, only the second slice is set to the I-coding mode and the remaining ones are set to the P-coding mode in the second frame, . . . , and only the 15-th slice is set to the I-coding mode and the remaining ones are set to the P-coding mode in the 15-th frame, so that the slice of the I-coding mode makes one round on the frames in 15 frames. Namely, by shifting the timing for starting the encoding by 1/15 frame time at a plurality of channels, the I-coding modes of the respective channels are prevented from overlapping each other.

In accordance with this embodiment, the encoding can be performed without overlapping the I-coding modes in which the amount of information is large, and thus the total amount of information input to the multiplexer 5 is always small as in the first embodiment. Further, since the slice of the I-coding mode makes a round on the frames in 15 frames, the transmission error of encoded signals can be handled and an interrupt decoding is enabled. In addition, although 15 slices were made for one frame in the fourth embodiment, of course the present invention is not limited to this. For instance, it is possible that n (n=2, 3, . . . ) slices are made for one frame so that the slice of the I-coding mode makes one round on the frames in n frames.

Figure 12:
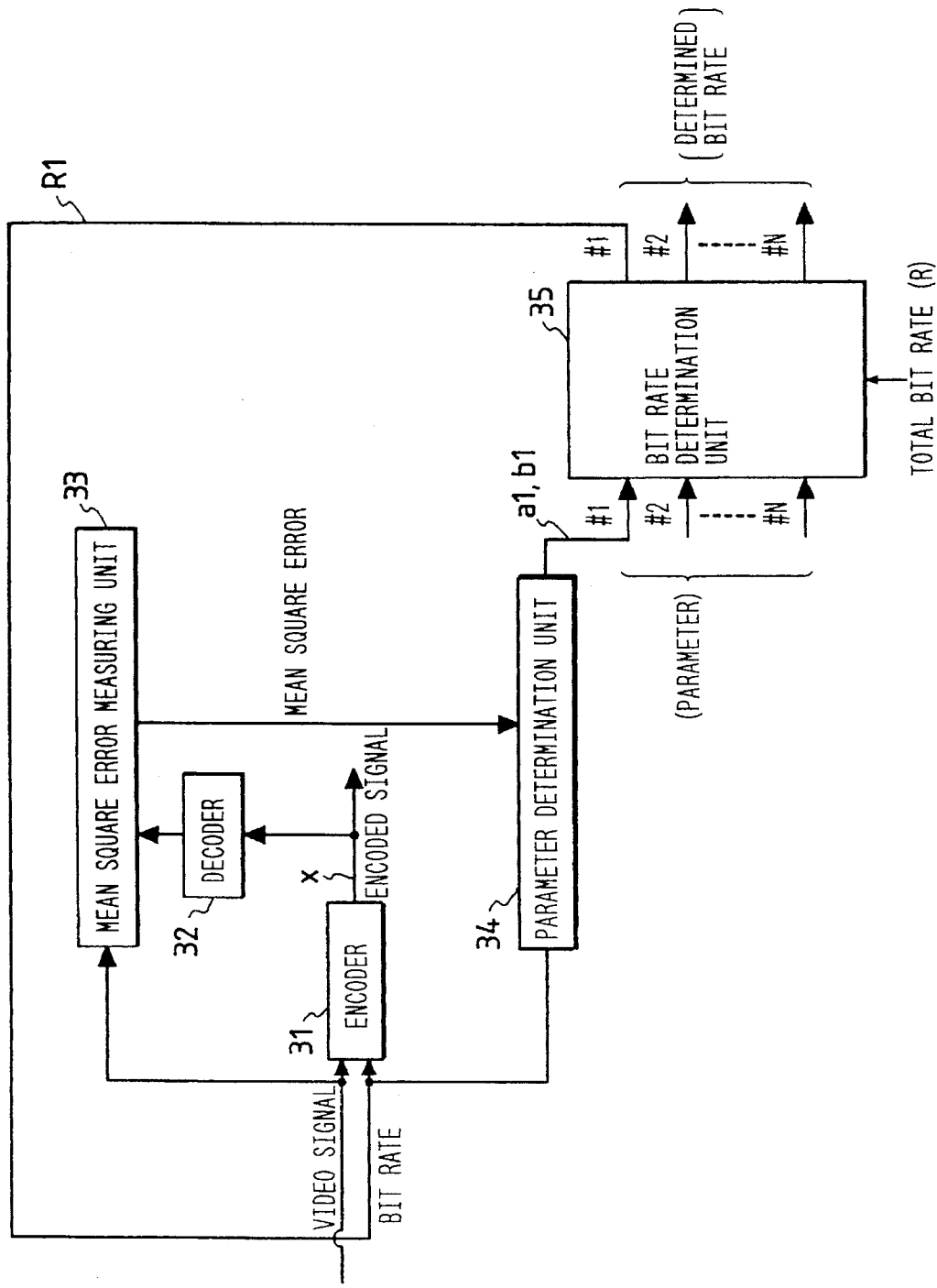
FIG. 12 is a block diagram showing the construction of the fifth embodiment of the present invention.

The fifth embodiment of the present invention is now described with reference to FIG. 12. This embodiment is to provide a controller for a video encoder system which can increase the total performance of a plurality of encoders under a predetermined total bit rate.

In the figure, an encoder 31 encodes an incoming video signal at a specified bit rate. A decoder 32 decodes the signal x encoded by the encoder 31. A mean square error measuring unit 33 measures the mean square error from the video signal and the decoding result. Further, numeral 34 is a parameter determination unit, and numeral 35 is a bit rate determination unit. Although, in FIG. 12, the encoder 31, decoder 32, mean square error measuring unit 33 and parameter determination unit 34 are shown for only one system, the same elements actually exist for N systems (N is an integer greater than one).

Figure 13:
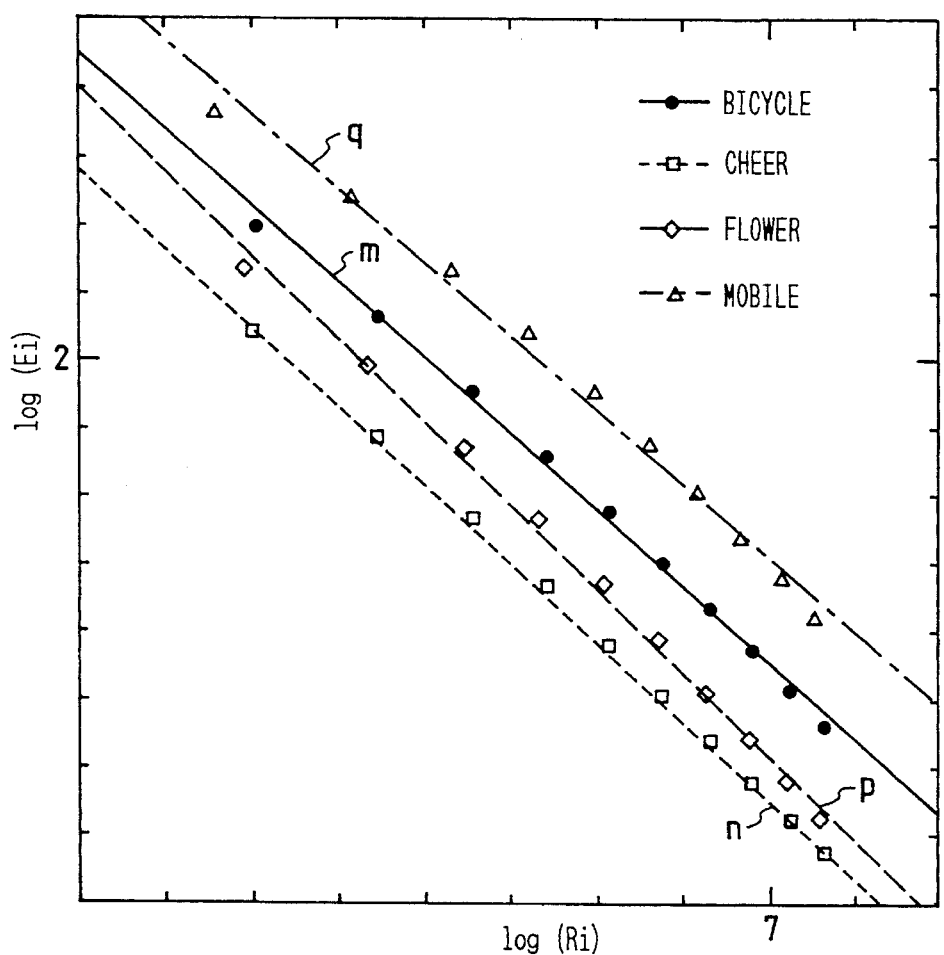
FIG. 13 is a bi-logarithmic graph showing the characteristics between the bit rate of an encoder and the mean square error.
Figure 14:
FIG. 14 is a block diagram showing an example of the conventional system.

The parameter determination unit 34 is described below with reference to FIG. 13. FIG. 13 represents the characteristics between the bit rate of the encoder and the mean square error by a bi-logarithmic graph. In the figure, the mean square error is represented by El, and the bit rate is represented by Ri. "Bicycle", "cheer", "flower" and "mobile" in the figure represent well-known test data. Of these test data, "flower garden" and "mobile and calendar" appear, for instance, in the Journal of the Television Society "Picture Information Engineering and Broadcast Technology", No. 9, Vol. 45, 1993, p. 122 (51). In addition, the points in the figure (represented by black circles, squares, lozenges and triangles) represent actually measured values, and lines m, n, p and q connecting these points represent approximate curves.

As apparent from the figure, it is seen that the approximate curves m, n, p and q are well approximated by straight lines (linear expressions). Then, the following equation (0) is valid.

$$Log\ Ei = ailogRi + bi \quad \ldots \quad (0)\ (i=1, 2, 3, \ldots, N)$$

Here, the base of logarithm is 10, ai represents the slope of a straight line, and bi represents the point at which the line crosses the ordinate. Although the parameters in this equation are ai and bi, these ai and bi can be completely determined by two measurements of the mean square error, because they are parameters of a straight line.

In the actual operation, the parameter determination unit 34 determines the parameters ai and bi, for instance, for every 15 frames, and apply the parameters ai and bi to the frames among the 15 frames. In this case, the previous measured value may be used as the first measured value, and the current measured value may be used as the second measured value.

The operation of the bit rate determination unit 35 is described below. The bit rate determination unit 35 determines bit rates R1, R2, ..., and RN which minimize the mean square error (E) represented by the equation (2), on condition that the total bit rate (R) represented by the following equation (1) is constant.

$$R = R1 + R2 + \ldots + RN \quad (1)$$

$$E = E1 + E2 + EN \quad (2)$$

This decision problem can be solved by using a Lagrange multiplier method. For simplicity, the following description is made on the assumption that N=3.

The decision problem means that the following simultaneous equations (3) under the condition of the equation (1) when the LaGrange's undetermined multiplier is assumed to be $\lambda$.

$$\left. \begin{array}{l} \frac{\theta}{\theta R1}\ \{E1 + E2 + E3 + \lambda(R - [R1 + R2 + R3])\} = 0 \\ \frac{\theta}{\theta R2}\ \{E1 + E2 + E3 + \lambda(R - [R1 + R2 + R3])\} = 0 \\ \frac{\theta}{\theta R3}\ \{E1 + E2 + E3 + \lambda(R - [R1 + R2 + R3])\} = 0 \end{array} \right\} \quad (3)$$

Here, by obtaining $Ei = 10^{bi} Ri^{ai}$ from log Ei = ailog Ri+bi (i=1, 2, 3) and rewriting the simultaneous equations (3), the following equations (4) are obtained.

$$\left. \begin{array}{l} R1 = \left(\dfrac{\lambda}{a1\ 10^{b1}}\right)^{1/(a1-1)} \\ R2 = \left(\dfrac{\lambda}{a2\ 10^{b2}}\right)^{1/(a2-1)} \\ R3 = \left(\dfrac{\lambda}{a3\ 10^{b3}}\right)^{1/(a3-1)} \end{array} \right\} \quad (4)$$

The above equations have four unknowns ($\lambda$, R1, R2, R3), and these can be solved because there are four equations including the above equation (1).

First, the above equations (4) are substituted for R1, R2 and R3 of the above equation (1) to make the following equation (5) for $\lambda$.

$$R = \left(\dfrac{\lambda}{a1\ 10^{b1}}\right)^{1/(a1-1)} + \left(\dfrac{\lambda}{a2\ 10^{b2}}\right)^{1/(a2-1)} + \left(\dfrac{\lambda}{a3\ 10^{b3}}\right)^{1/(a3-1)} \quad (5)$$

Then, the equation (5) is solved by the Newton method for numerical calculation to determine the Lagrange's undefined multiplier $\lambda$, and substituting this in the equations of R1, R2 and R3 (the above equations (4)), the optimum bit rate of each encoder is obtained.

Since the above calculation result $\lambda 0$ is prestored in the bit rate determination unit 35, the bit rate determination unit 35 can determine the optimum bit rate of each encoder by substituting the parameters ai and bi determined by the parameter determination unit 34 in the equation (4) substituted the calculation result $\lambda 0$. The determined bit Pate is fed back to the encoder 31. Upon receipt of the bit rate, the encoder 31 performs an encoding with this bit rate.

As a result, in accordance with this embodiment, the bit rate determination unit 35 can determine the optimum bit rate for each encoder in the point that it minimizes the perceptually weighted distortion, and thus the perceptually weighted distortion of the total system can be minimized under a predetermined bit rate.

The sixth embodiment of the present invention is now described. In this embodiment, paying attention to that the approximate curves m, n, p and q of FIG. 13 have a fixed slope, a of the above equation (0) is made constant, and b is made a parameter. As a, a mean value obtained from the result of a measurement previously performed for many picture samples is used.

According to this embodiment, the parameter b can identify the above equation (0), that is, the relational expression of the bit rate R and the mean square error, by one observation.

Since this embodiment is equivalent to the case in which a1=a2=a3=a in the above equation (4), the equation corresponding to the equation (5) of the first embodiment becomes as shown by the following equation (6).

$$\begin{aligned} R &= \left(\dfrac{\lambda}{a\ 10^{b1}}\right)^{1/(a-1)} + \left(\dfrac{\lambda}{a\ 10^{b2}}\right)^{1/(a-1)} + \left(\dfrac{\lambda}{a\ 10^{b3}}\right)^{1/(a-1)} \quad (6) \\ &= \left\{ \left(\dfrac{1}{a\ 10^{b1}}\right)^{1/(a-1)} + \left(\dfrac{1}{a\ 10^{b2}}\right)^{1/(a-1)} + \left(\dfrac{1}{a\ 10^{b3}}\right)^{1/(a-1)} \right\} \lambda^{1/(a-1)} \end{aligned}$$

From this equation (6), the Lagrange's undetermined multiplier $\lambda$ is determined as shown by the following equation (7).

$$\lambda = \frac{R^{(a-1)}}{\left\{ \left(\frac{1}{a\,10^{b1}}\right)^{1/(a-1)} + \left(\frac{1}{a\,10^{b2}}\right)^{1/(a-1)} + \left(\frac{1}{a\,10^{b3}}\right)^{1/(a-1)} \right\}^{(a-1)}} \quad (7)$$

If the equation (7) is substituted in the above equation (4) where a1=a2=a3=a, the following equations (8) are obtained.

$$\begin{aligned}
R1 &= \frac{R}{(a10^{b1})^{1/(a-1)}} \times \frac{1}{\left(\frac{1}{a10^{b1}}\right)^{1/(a-1)} + \left(\frac{1}{a10^{b2}}\right)^{1/(a-1)} + \left(\frac{1}{a10^{b3}}\right)^{1/(a-1)}} \\
R2 &= \frac{R}{(a10^{b2})^{1/(a-1)}} \times \frac{1}{\left(\frac{1}{a10^{b1}}\right)^{1/(a-1)} + \left(\frac{1}{a10^{b2}}\right)^{1/(a-1)} + \left(\frac{1}{a10^{b3}}\right)^{1/(a-1)}} \\
R3 &= \frac{R}{(a10^{b3})^{1/(a-1)}} \times \frac{1}{\left(\frac{1}{a10^{b1}}\right)^{1/(a-1)} + \left(\frac{1}{a10^{b2}}\right)^{1/(a-1)} + \left(\frac{1}{a10^{b3}}\right)^{1/(a-1)}}
\end{aligned} \quad (8)$$

As described above, in accordance with this embodiment, there is a merit that the bit rate for each encoder can be determined by the simple equations (8).

Incidentally, the mean square error is used as the perceptually weighted distortion in the fifth and sixth embodiments, but the present invention is not limited to this, and visually weighted mean square error may be used as the perceptually weighted distortion. The visual weight is a weight coefficient which is obtained by numerically expressing the difference in sensitiveness depending on frequency components, a visual characteristic of human being, or the masking effect that distortion is difficult to sense when the brightness value rapidly varies, and which is multiplied by coding distortion. Since for each encoder, the characteristics between the bit rate and the weighted mean square error is expressed by a relational expression similar to the equation (0), the bit rate for each encoder can be determined by a method similar to the above described one in the sense that the perceptually weighted distortion is minimized.

In accordance with the fifth and sixth embodiments, there is an effect that the perceptually weighted distortion of the total visual encoder system can be minimized under a predetermined total bit rate.

As obvious from the above description, in accordance with the present invention, the operation timing of a plurality of video encoders can be controlled so that the amounts of encoded output information of the plurality of video encoders do no become maximized at the same time, and accordingly, there is an effect that the amounts of simultaneously generated encoded information can greatly be reduced at the sacrifice of nothing about the coding quality, as compared with the case in which they become maximum at the same time. Also, there is an effect that the perceptually weighted distortion of the total video encoder system can be minimized under a predetermined total bit rate.

What is claimed is:

1. A bit rate controller for a multiplexer of an encoded video for multiplexing the encoded outputs of a plurality of video encoders, said bit rate controller comprising:

a plurality of video encoders for performing an encoding for each of a plurality of frames wherein intra-frame codings and inter-frame codings regularly alternately appear; and a controller for controlling the operation timing of said plurality of video encoders so that said intra-frame codings are not performed at the same time, wherein the amounts of encoded output information of said plurality of video encoders do not become maximum at the same time.

2. A bit rate controller for a multiplexer of an encoded video for multiplexing the encoded outputs of a plurality of video encoders, said bit rate controller comprising:

a plurality of video encoders for performing an encoding for each of frames in which one frame is divided into a plurality of groups each consisting of a plurality of blocks, wherein the encoding is cyclically performed such that intra-frame codings are performed for one group of said plurality of groups while inter-frame codings are performed for the other groups; and a controller for controlling the operation timing of said plurality of video encoders so that said intra-frame codings are not performed at the same time, wherein said plurality of video encoders do not perform the intra frame codings of one group at the same time.

3. A bit rate controller for a multiplexer of an encoded video for multiplexing the encoded outputs of a plurality of video encoders in a plurality of stages, said bit rate controller comprising:

a controller for controlling the operation timing of said plurality of video encoders so that the amount of encoded output information of said plurality of video encoders are not at a maximum at the same time;

means for detecting the overlap interval of frames or groups each consisting of a plurality of blocks in which the amount of generated information of said video encoders is larger than that of inter-frame coding; and a plurality of variable delay units connected to the respective later stages of said plurality of video encoders; wherein the delay time of said variable delay unit connected to one of the video encoders having caused said overlap is set to said overlap interval.

4. A bit rate controller for a multiplexer of an encoded video for multiplexing the encoded outputs of a plurality of video encoders, said bit rate controller comprising:

a unit for detecting the coding distortion for the bit rate of each encoder;

a parameter determination unit for determining the parameters a and b of Log Ei= a Log Ri+ b from the relationship between the coding distortion Ei detected in said detection unit and the bit rate Ri; and a bit rate determination unit for determining the bit rate for said each encoder which minimizes the total sum of said coding distortions, based on the linear equation determined by said parameter determination unit and on condition that the total sum of the bit rates is constant, wherein said determined bit rates are distributed to said each encoder.

5. A bit rate controller for a multiplexer of an encoded video of claim 4 wherein said parameter a is a constant.

6. A bit rate controller for a multiplexer of an encoded video of claim 4, wherein one of mean square error and visually weighted mean square error are used as said coding distortion.

* * * * *

UNITED STATES PATENT AND TRADEMARK OFFICE
CERTIFICATE OF CORRECTION

PATENT NO. : 5,550,590
DATED : August 27, 1996
INVENTOR(S) : Sakazawa et al.

It is certified that error appears in the above-indentified patent and that said Letters Patent is hereby corrected as shown below:

Column 7, line 39, please change Equation 2 to read as follows:

--$E = E1 + E2 + \ldots + EN$--

Signed and Sealed this

Third Day of December, 1996

Attest:

BRUCE LEHMAN

Attesting Officer          Commissioner of Patents and Trademarks